United States Patent
Chandramouli et al.

(10) Patent No.: US 12,107,927 B2
(45) Date of Patent: Oct. 1, 2024

(54) APPARATUS, METHOD, AND COMPUTER PROGRAM

(71) Applicant: NOKIA TECHNOLOGIES OY, Espoo (FI)

(72) Inventors: Devaki Chandramouli, Plano, TX (US); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/766,023

(22) PCT Filed: Sep. 23, 2020

(86) PCT No.: PCT/EP2020/076568
§ 371 (c)(1),
(2) Date: Apr. 1, 2022

(87) PCT Pub. No.: WO2021/063767
PCT Pub. Date: Apr. 8, 2021

(65) Prior Publication Data
US 2022/0345532 A1 Oct. 27, 2022

Related U.S. Application Data

(60) Provisional application No. 62/908,707, filed on Oct. 1, 2019.

(51) Int. Cl.
*G06F 15/16* (2006.01)
*H04L 67/146* (2022.01)
*H04W 28/02* (2009.01)
(52) U.S. Cl.
CPC ....... *H04L 67/146* (2013.01); *H04W 28/0215* (2013.01)

(58) Field of Classification Search
CPC ..... H04L 67/14; H04L 67/141; H04L 67/142; H04L 67/146; H04W 28/0215
(Continued)

(56) References Cited

U.S. PATENT DOCUMENTS 11,240,699 B2 * 2/2022 Huang-Fu ............. H04W 80/10
2018/0227743 A1 8/2018 Faccin et al.
(Continued)

FOREIGN PATENT DOCUMENTS

EP 3 496 465 A1 6/2019

OTHER PUBLICATIONS

International Search Report and Written Opinion dated Dec. 18, 2020 corresponding to International Patent Application No. PCT/EP2020/076568.
(Continued)

Primary Examiner — Bharat Barot
(74) Attorney, Agent, or Firm — Lippes Mathias LLP

(57) ABSTRACT

Various example embodiments described herein generally relate to apparatuses, methods and computer programs. For instance, an apparatus may include at least one processor and at least one memory including computer code, the at least one memory and the computer code configured, with the at least one processor, to cause the apparatus at least to receive, at a user plane function, a request to establish a session from a session management function, where the user plane function is part of a set of user plane functions. The at least one memory and the computer code may be further configured, with the at least one processor, to cause the apparatus at least to cause a response to be provided to the session management function, where the response includes information uniquely identifying the session in the set of user plane functions.

19 Claims, 17 Drawing Sheets

(58) Field of Classification Search
USPC .................................................. 709/227–228
See application file for complete search history.

(56) References Cited

U.S. PATENT DOCUMENTS

| | | | |
|---|---|---|---|
| 2018/0270888 A1* | 9/2018 | Faccin | H04W 76/15 |
| 2020/0205225 A1* | 6/2020 | Hu | H04W 80/10 |
| 2020/0336949 A1* | 10/2020 | Lee | H04W 36/0011 |
| 2022/0014944 A1* | 1/2022 | Liang | H04W 24/04 |
| 2022/0304104 A1* | 9/2022 | Mihály | H04W 76/19 |

OTHER PUBLICATIONS

3GPP TR 23.793 V0.5.0 (Jun. 2018), Technical Report, 3rd Generation Partnership Project; Technical Specification Group Services and System Aspects; Study on Access Traffic Steering, Switching and Splitting support in the 5G system architecture (Release 16), Jun. 2018.

3GPP TS 29.244 V16.0.0 (Jun. 2019), Technical Specification, 3rd Generation Partnership Project; Technical Specification Group Core Network and Terminals; Interface between the Control Plane and the User Plane Nodes; Stage 3 (Release 16), Jun. 2019.

3GPP TS 23.501 V16.1.0 (Jun. 2019), Technical Specification, 3rd Generation Partnership Project; Technical Specification Group Services and System Aspects; System Architecture for the 5G System; Stage 2 (Release 16) Jun. 2019.

S. Cheshire et al., "IPv4 Address Conflict Detection," Network Working Group, RFC 5227, IETF, Jul. 2008.

* cited by examiner

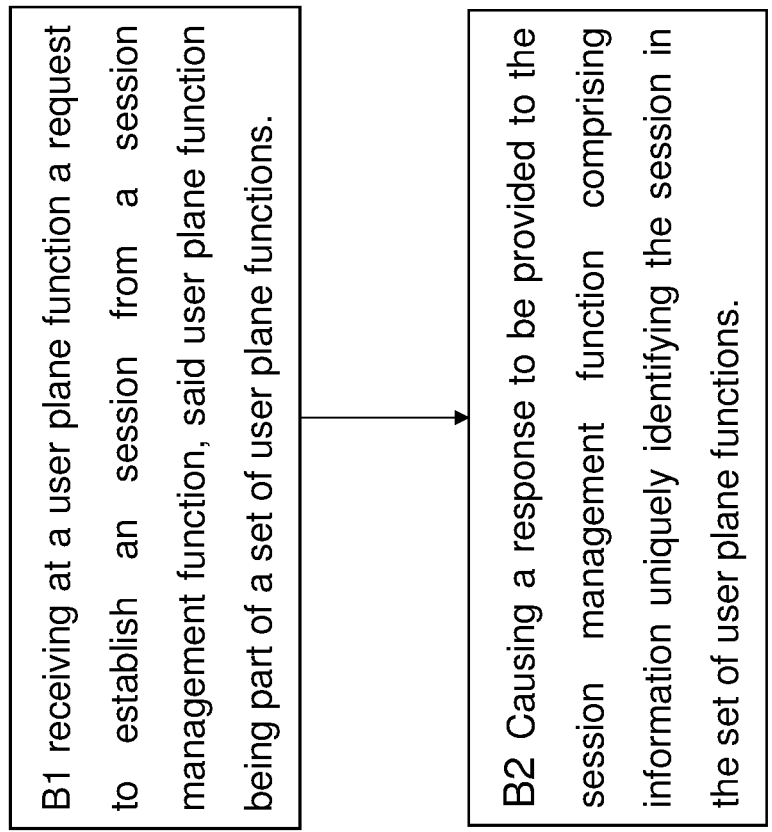

Fig. 9

B1 receiving at a user plane function a request to establish an session from a session management function, said user plane function being part of a set of user plane functions.

B2 Causing a response to be provided to the session management function comprising information uniquely identifying the session in the set of user plane functions.

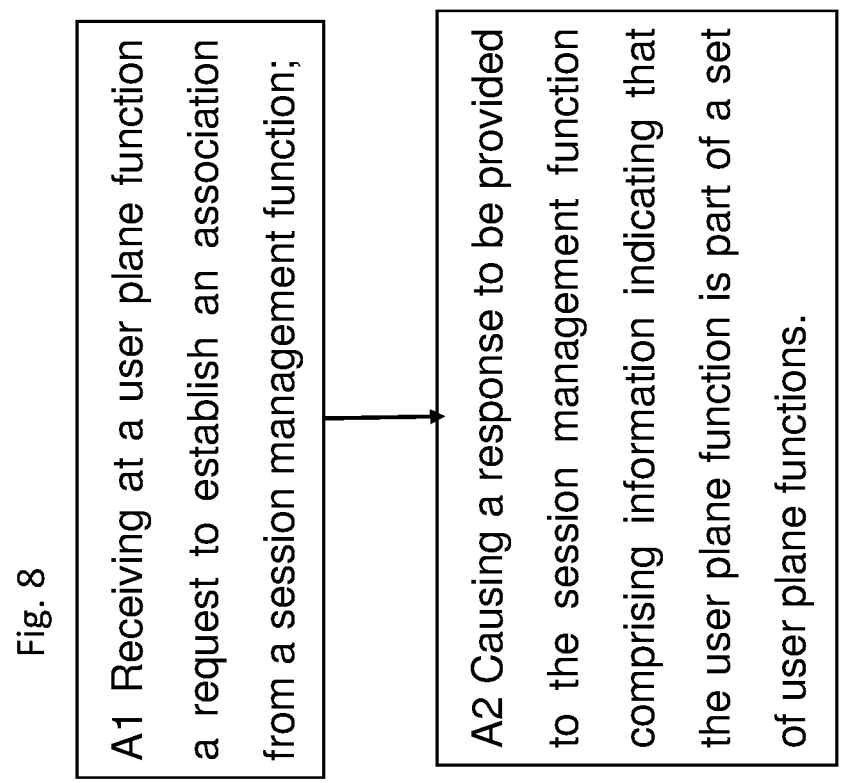

Fig. 8

A1 Receiving at a user plane function a request to establish an association from a session management function;

A2 Causing a response to be provided to the session management function comprising information indicating that the user plane function is part of a set of user plane functions.

Fig. 11

D1 causing context information associated with an session between a session management function and a user plane function of a set of user plane functions to be stored in a database and/or shared by the user plane functions of the set of user plane functions..

Fig. 10

C1 determining at a user plane function which is part of a set of user plane functions that a new user plane function has been assigned to support a session C2 causing information about the new user plane function assigned to support the session to be sent to a session management function.

Fig. 13

F1 receiving at a user plane function of a set of user plane functions, a message from a session management function F2 forwarding the message to a different user plane function of the set of user plane functions..

Fig. 12

E1 retrieving by a user plane function of a set of user plane functions, from a database, context information associated with a session established between a session management function and a different user plane function of set of user plane function E2 using said context information for the session between said user plane function and said session management function.

Fig. 15

H1 causing a message to be sent to a session management function from a user plane function of a set of user plane functions, said message comprising information indicating that a session between the user plane function and the session management function is to be updated to use a different user plane function of the set of user plane functions

Fig. 14

G1 receiving at a user plane function of a set of user plane functions, a message from a session management function G2 causing a response to be sent to the session management function indicating that the message is to be redirected to a different user plane function of the set of user plane functions

Fig. 17

J1 causing a request to be transmitted to a user plane function from a session management function, said request to establish an session, said user plane function being part of a set of user plane functions J2 receiving a response from the user plane function comprising information uniquely identifying that user plane function.

Fig. 16

I1 causing a request to be transmitted to a user plane function from a session management function, said request being a request to establish an association I2 receiving at the session management function a response comprising information indicating that the user plane function is part of a set of user plane functions.

Fig. 18

K1 receiving information from a user plane function which is part of a set of user plane functions that a new user plane function in the set of user plane functions has been assigned for supporting a session

Fig. 19

L1 moving, by a session management function, a session from one user plane function of a set of user plane functions to a second user plane function of the set of user plane functions.

Fig. 20

M1 discovering by a session management functions which user plane functions belong to a given set of user plane functions.

Fig. 22

O1 setting up a first association between a first user plane function of a set of user plane functions and a session management function O2 setting up a session between the first user plane function and the session management function O3 setting up a second association between a second user plane function of the set of user plane functions and the session management function O4 moving the session to the second association.

Fig. 21

N1 setting up an association between a first user plane function of a set of user plane functions and a session management function N2 sharing that association with one or more other user plane functions of the set.

APPARATUS, METHOD, AND COMPUTER PROGRAM

CROSS-REFERENCE TO RELATED APPLICATIONS

This patent application is a national stage entry of and claims priority to International Application No. PCT/EP2020/076568, filed on Sep. 23, 2020, which in turn claims priority to U.S. Provisional Patent Application 62/907,707 filed on Oct. 1, 2019. Each of the foregoing applications are incorporated herein by reference in their entirety.

FIELD OF THE DISCLOSURE

The present disclosure relates to an apparatus, a method, and a computer program and in particular but not exclusively for apparatus, methods and computer programs for user plane functions.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: receiving at a user plane function a request to establish an association from a session management function; and causing a response to be provided to the session management function comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a fully qualified domain name for the user plane function set.

According to another aspect, there is provided a method comprising: receiving at a user plane function a request to establish a session from a session management function, said user plane function being part of a set of user plane functions; and causing a response to be provided to the session management function comprising information uniquely identifying the session in that set of user plane functions.

The session may be a packet forward control protocol session.

The information uniquely identifying the session in the set of user plane functions may be a unique session identifier.

The information uniquely identifying the session in the set of user plane functions may be a user plane function internet protocol address and/or a session identifier.

According to another aspect, there is provided a method comprising: determining at a user plane function which is part of a set of user plane functions that a new user plane function has been assigned to support a session; and causing information about the new user plane function assigned to support the session to be sent to a session management function.

The session may be a packet forward control protocol session

According to another aspect, there is provided a method comprising: causing context information associated with a session between a session management function and a user plane function of a set of user plane functions to be stored in a database and/or shared by the user plane functions of the set of user plane functions.

The session may be a packet forward control protocol session.

The user plane function may cause the information to be stored in the database.

The method may comprise causing the context information to be stored when there is no traffic for the session.

The method may comprise causing the context information to be stored when there is no signalling or user plane traffic for the session.

The method may comprise retrieving said context information from said database to restore a context associated with the session.

The method may comprise retrieving said context information by said user plane function or another user plane function of said set of user plane functions.

The method may comprise determining that there is traffic to be processed and in response retrieving said context information.

The method may comprise removing by the user plane function the context information of the session from the user plane function. This may free resources in the user plane function associated with the context. This may be while there is a session between one of the user plane functions of the set of user plane functions and the session management function.

According to another aspect, there is provided a method comprising: retrieving by a user plane function of a set of user plane functions, from a database, context information associated with a session established between a session management function and a different user plane function of set of user plane function; and using said context information for the session between said user plane function and said session management function.

The session may be a packet forward control protocol session.

According to another aspect, there is provided a method comprising: receiving at a user plane function of a set of user plane functions, a message from a session management function; and forwarding the message to a different user plane function of the set of user plane functions.

The message may be a request.

The user plane function towards which the request is forwarded may respond to the session management function.

According to another aspect, there is provided a method comprising: receiving at a user plane function of a set of user plane functions, a message from a session management function; and causing a response to be sent to the session management function indicating that the message is to be redirected to a different user plane function of the set of user plane functions.

The response may comprise information identifying the different user plane function.

According to another aspect, there is provided a method comprising: causing a message to be sent to a session management function from a user plane function of a set of user plane functions, said message comprising information indicating that a session between the user plane function and the session management function is to be updated to use a different user plane function of the set of user plane functions.

The session may be a packet forward control protocol session.

According to an aspect, there is provided a method comprising: causing a request to be transmitted to a user plane function from a session management function, said request being a request to establish an association; and receiving at the session management function a response comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a fully qualified domain name for the user plane function set.

According to another aspect, there is provided a method comprising: causing a request to be transmitted to a user plane function from a session management function, said request to establish an session, said user plane function being part of a set of user plane functions; and receiving a response from the user plane function comprising information uniquely identifying that user plane function in the set of user plane functions.

The session may be a packet forward control protocol session.

The information uniquely identifying the session in the set of user plane functions may be a unique session identifier.

The information uniquely identifying the user plane function may be a user plane function internet protocol address and a session identifier.

According to another aspect, there is provided a method comprising: receiving information from a user plane function which is part of a set of user plane functions that a new user plane function in the set of user plane functions has been assigned for supporting a session.

The session may be a packet forward control protocol session.

According to another aspect, there is provided a method comprising: moving, by a session management function, a session from one user plane function of a set of user plane functions to a second user plane function of the set of user plane functions.

According to another aspect, there is provided a method comprising: moving, by a user plane function, a session from one user plane function of a set of user plane functions to a second user plane function of the set of user plane functions.

The session may be a packet forward control protocol session.

According to another aspect, there is provided a method comprising: discovering by a session management function which user plane functions belong to a given set of user plane functions.

The discovering may comprise receiving information about the user plane functions belonging to the set of user plane functions from one of the user plane functions of the set of user plane functions.

The discovering may comprise using a domain name system.

The discovering may comprise using a network repository function.

According to another aspect, there is provided a method comprising: determining that a heartbeat failure occurs for all user plane functions of a set of user plane functions; and when a heat beat failure has been determined for all user plane functions of the set of user plane functions, causing a session restoration procedure.

According to another aspect, there is provided a method comprising: determining by a session management function that a user plane function of a set of user plane functions is unresponsive; and in response sending a session related request to another user plane function of the set.

According to another aspect, there is provided a method comprising: setting up an association between a first user plane function of a set of user plane functions and a session management function; and sharing that association with one or more other user plane functions of the set.

According to another aspect, there is provided a method comprising: setting up a first association between a first user plane function of a set of user plane functions and a session management function; setting up a session between the first user plane function and the session management function; setting up a second association between a second user plane function of the set of user plane functions and the session management function; and moving the session to the second association.

According to another aspect, there is provided a method comprising: setting up an association between a first user plane function of a set of user plane functions and a first session management function of a set of session management functions; and sharing that association with one or more other user plane functions of the set and one or more other session management functions.

According to another aspect, there is provided an apparatus comprising means for: receiving at a user plane function a request to establish an association from a session management function; and causing a response to be provided to the session management function comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a fully qualified domain name for the user plane function set.

According to another aspect, there is provided an apparatus comprising means for: receiving at a user plane function a request to establish an session from a session management function, said user plane function being part of a set of user plane functions; and causing a response to be provided to the session management function comprising information uniquely identifying the session in that set of user plane functions.

The session may be a packet forward control protocol session.

The information uniquely identifying the session in the set of user plane functions may be a unique session identifier.

The information uniquely identifying the session in the set of user plane functions may be a user plane function internet protocol address and/or a session identifier.

According to another aspect, there is provided an apparatus comprising means for: determining at a user plane function which is part of a set of user plane functions that a new user plane function has been assigned to support a session; and causing information about the new user plane function assigned to support the sessions to be sent to a session management function.

The session may be a packet forward control protocol session.

According to another aspect, there is provided an apparatus comprising means for: causing context information associated with a session between a session management function and a user plane function of a set of user plane functions to be stored in a database and/or shared by the user plane functions of the set of user plane functions.

The session may be a packet forward control protocol session.

The user plane function may cause the information to be stored in the database.

The means may be for causing the context information to be stored when there is no traffic for the session.

The means may be for causing the context information to be stored when there is no signalling or user plane traffic for the session.

The means may be for retrieving said context information from said database to restore a context associated with the context.

The means may be for comprising retrieving said context information by said user plane function or another user plane function of said set of user plane functions.

The means may be for determining that there is traffic to be processed and in response retrieving said context information.

The means may be for removing by the user plane function the context information of the session from the user plane function. This may free resources in the user plane function associated with the context. This may be while there is a session between one of the user plane functions of the set of user plane functions and the session management function.

According to another aspect, there is provided an apparatus comprising means for: retrieving by a user plane function of a set of user plane functions, from a database, context information associated with a session established between a session management function and a different user plane function of set of user plane function;

and using said context information for the session between said user plane function and said session management function.

The session may be a packet forward control protocol session.

According to another aspect, there is provided an apparatus comprising means for: receiving at a user plane function of a set of user plane functions, a message from a session management function; and forwarding the message to a different user plane function of the set of user plane functions.

The message may be a request.

The user plane function towards which the request is forwarded may respond to the session management function.

According to another aspect, there is provided an apparatus comprising means for: receiving at a user plane function of a set of user plane functions, a message from a session management function; and causing a response to be sent to the session management function indicating that the message is to be redirected to a different user plane function of the set of user plane functions.

The response may comprise information identifying the different user plane function.

According to another aspect, there is provided an apparatus comprising means for: causing a message to be sent to a session management function from a user plane function of a set of user plane functions, said message comprising information indicating that a session between the user plane function and the session management function is to be updated to use a different user plane function of the set of user plane functions.

The session may be a packet forward control protocol session.

According to an aspect, there is provided a an apparatus comprising means for: causing a request to be transmitted to a user plane function from a session management function, said request being a request to establish an association; and receiving at the session management function a response comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a fully qualified domain name for the user plane function set.

According to another aspect, there is provided an apparatus comprising means for: causing a request to be transmitted to a user plane function from a session management function, said request to establish an session, said user plane function being part of a set of user plane functions; and receiving a response from the user plane function comprising information uniquely identifying that user plane function in the set of user plane functions.

The session may be a packet forward control protocol session.

The information uniquely identifying the session in the set of user plane functions may be a unique session identifier.

The information uniquely identifying the user plane function may be a user plane function internet protocol address and a session identifier.

According to another aspect, there is provided an apparatus comprising means for: receiving information from a user plane function which is part of a set of user plane functions that a new user plane function in the set of user plane functions has been assigned for supporting a session.

The session may be a packet forward control protocol session.

According to another aspect, there is provided an apparatus comprising means for: moving, by a session management function, a session from one user plane function of a set of user plane functions to a second user plane function of the set of user plane functions.

The session may be a packet forward control protocol session.

According to another aspect, there is provided a method comprising: moving, by a user plane function, a session from one user plane function of a set of user plane functions to a second user plane function of the set of user plane functions.

The session may be a packet forward control protocol session.

According to another aspect, there is provided an apparatus comprising means for: discovering by a session management function which user plane functions belong to a given set of user plane functions.

The discovering may comprise receiving information about the user plane functions belonging to the set of user plane functions from one of the user plane functions of the set of user plane functions.

The discovering may comprise using a domain name system.

The discovering may comprise using a network repository function.

According to another aspect, there is provided a system comprising means for: setting up an association between a first user plane function of a set of user plane functions and a session management function; and sharing that association with one or more other user plane functions of the set.

According to another aspect, there is provided a system comprising means for: setting up a first association between a first user plane function of a set of user plane functions and a session management function; setting up a session between the first user plane function and the session management function; setting up a second association between a second user plane function of the set of user plane functions and the session management function; and moving the session to the second association.

According to another aspect, there is provided a system comprising means for: setting up an association between a first user plane function of a set of user plane functions and a first session management function of a set of session management functions; and sharing that association with one or more other user plane functions of the set and one or more other session management functions.

According to another aspect, there is provided an apparatus comprising means for: determining that a heartbeat failure occurs for all user plane functions of a set of user plane functions; and when a heat beat failure has been determined for all user plane functions of the set of user plane functions, causing a session restoration procedure.

According to another aspect, there is provided an apparatus comprising means for: determining by a session management function that a user plane function of a set of user plane functions is unresponsive; and in response sending a session related request to another user plane function of the set.

According to another aspect there is provided an apparatus comprising at least one processor and at least one memory including computer code for one or more programs, the at least one memory and the computer code configured, with the at least one processor, to cause the apparatus at least to: receive at a user plane function a request to establish an association from a session management function; and cause a response to be provided to the session management function comprising information indicating that the user plane function is part of a set of user plane functions.

The information indicating that the user plane function is part of a set of user plane functions may comprise information identifying the set of user plane functions and/or information identifying each of the user plane functions of the set.

The information identifying the set of user plane functions may be a set identifier.

The information indicating that the user plane function is part of a set of user plane functions may comprise a fully qualified domain name for the user plane function set.

According to another aspect there is provided an apparatus comprising at least one processor and at least one memory including computer code for one or more programs, the at least one memory and the computer code configured, with the at least one processor, to cause the apparatus at least to: receive at a user plane function a request to establish an session from a session management function, said user plane function being part of a set of user plane functions; and cause a response to be provided to the session management function comprising information uniquely identifying the session in that set of user plane functions.

The session may be a packet forward control protocol session.

The information uniquely identifying the session in the set of user plane functions may be a unique session identifier.

The information uniquely identifying the session in the set of user plane functions may be a user plane function internet protocol address and/or a session identifier.

According to another aspect there is provided an apparatus comprising at least one processor and at least one memory including computer code for one or more programs, the at least one memory and the computer code configured, with the at least one processor, to cause the apparatus at least to: determine at a user plane function which is part of a set of user plane functions that a new user plane function has been assigned to support a session; and cause information about the new user plane function assigned to support the sessions to be sent to a session management function.

The session may be a packet forward control protocol session.

According to another aspect there is provided an apparatus comprising at least one processor and at least one memory including computer code for one or more programs, the at least one memory and the computer code configured, with the at least one processor, to cause the apparatus at least to: cause context information associated with a session between a session management function and a user plane function of a set of user plane functions to be stored in a database and/or shared by the user plane functions of the set of user plane functions.

The session may be a packet forward control protocol session.

The user plane function may cause the information to be stored in the database.

The at least one memory and the computer program code may be configured to, with the at least one processor, cause the apparatus at least to cause the context information to be stored when there is no traffic for the session.

The at least one memory and the computer program code may be configured to, with the at least one processor, cause the apparatus at least to cause the context information to be stored when there is no signalling or user plane traffic for the session.

The at least one memory and the computer program code may be configured to, with the at least one processor, cause the apparatus at least to retrieve said context information from said database to restore a context associated with the context.

The at least one memory and the computer program code may be configured to, with the at least one processor, cause the apparatus at least to retrieve said context information by said user plane function or another user plane function of said set of user plane functions.

The at least one memory and the computer program code may be configured to, with the at least one processor, cause the apparatus at least to determine that there is traffic to be processed and in response retrieving said context information.

The at least one memory and the computer program code may be configured to, with the at least one processor, cause the apparatus at least to remove by the user plane function the context information of the session from the user plane function. This may free resources in the user plane function associated with the context. This may be while there is a session between one of the user plane functions of the set of user plane functions and the session management function.

According to another aspect there is provided an apparatus comprising at least one processor and at least one memory including computer code for one or more programs, the at least one memory and the computer code configured, with the at least one processor, to cause the apparatus at least to: retrieve by a user plane function of a set of user plane functions, from a database, context information associated a session established between a session management function and a different user plane function of set of user plane function; and use said context information for a session established between said user plane function and said session management function.

The session may be a packet forward control protocol session.

According to another aspect there is provided an apparatus comprising at least one processor and at least one memory including computer code for one or more programs, the at least one memory and the computer code configured, with the at least one processor, to cause the apparatus at least to: receive at a user plane function of a set of user plane functions, a message from a session management function; and forwarding he message to a different user plane function of the set of user plane functions.

The message may be a request.

The user plane function towards which the request is forwarded may respond to the session management function.

According to another aspect there is provided an apparatus comprising at least one processor and at least one memory including computer code for one or more programs, the at least one memory and the computer code configured, with the at least one processor, to cause the apparatus at least to: receive at a user plane function of a set of user plane functions, a message from a session management function; and cause a response to be sent to the session management function indicating that the message is to be redirected to a different user plane function of the set of user plane functions.

The response may comprise information identifying the different user plane function.

According to another aspect there is provided an apparatus comprising at least one processor and at least one memory including computer code for one or more programs, the at least one memory and the computer code configured, with the at least one processor, to cause the apparatus at least to: cause a message to be sent to a session management function from a user plane function of a set of user plane functions, said message comprising information indicating that a session between the user plane function and the session management function is to be updated to use a different user plane function of the set of user plane functions.

The session may be a packet forward control protocol session.

According to another aspect there is provided an apparatus comprising at least one processor and at least one memory including computer code for one or more programs, the at least one memory and the computer code configured, with the at least one processor, to cause the apparatus at least to: cause a request to be transmitted to a user plane function from a session management function, said request being a request to establish an association; and receive at the session management function a response comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a fully qualified domain name for the user plane function set.

According to another aspect there is provided an apparatus comprising at least one processor and at least one memory including computer code for one or more programs, the at least one memory and the computer code configured, with the at least one processor, to cause the apparatus at least to: cause a request to be transmitted to a user plane function from a session management function, said request to establish an session, said user plane function being part of a set of user plane functions; and receive a response from the user plane function comprising information uniquely identifying that user plane function.

The session may be a packet forward control protocol session.

The information uniquely identifying the session in the set of user plane functions may be a unique session identifier.

The information uniquely identifying the user plane function may be a user plane function internet protocol address and/or a session identifier.

According to another aspect there is provided an apparatus comprising at least one processor and at least one memory including computer code for one or more programs, the at least one memory and the computer code configured, with the at least one processor, to cause the apparatus at least to: receive information from a user plane function which is part of a set of user plane functions that a new user plane function in the set of user plane functions has been assigned for supporting a session.

The session may be a packet forward control protocol session.

According to an aspect there is provided an apparatus comprising at least one processor and at least one memory including computer code for one or more programs, the at least one memory and the computer code configured, with the at least one processor, to cause the apparatus at least to: move, by a session management function, a session from one user plane function of a set of user plane functions to a second user plane function of the set of user plane functions.

The session may be a packet forward control protocol session.

According to another aspect, there is provided a method comprising: moving, by a user plane function, a session from one user plane function of a set of user plane functions to a second user plane function of the set of user plane functions.

The session may be a packet forward control protocol session.

According to an aspect there is provided an apparatus comprising at least one processor and at least one memory including computer code for one or more programs, the at least one memory and the computer code configured, with the at least one processor, to cause the apparatus at least to: discover by a session management function which user plane functions belong to a given set of user plane functions.

The discovering may comprise receiving information about the user plane functions belonging to the set of user plane functions from one of the user plane functions of the set of user plane functions.

The discovering may comprise using a domain name system.

The discovering may comprise using a network repository function.

According to an aspect there is provided an apparatus comprising at least one processor and at least one memory including computer code for one or more programs, the at least one memory and the computer code configured, with the at least one processor, to cause the apparatus at least to: determine that a heartbeat failure occurs for all user plane functions of a set of user plane functions; and when a heat beat failure has been determined for all user plane functions of the set of user plane functions, cause a session restoration procedure.

According to an aspect there is provided an apparatus comprising at least one processor and at least one memory including computer code for one or more programs, the at least one memory and the computer code configured, with the at least one processor, to cause the apparatus at least to: determine by a session management function that a user plane function of a set of user plane functions is unresponsive; and in response send a session related request to another user plane function of the set.

According to an aspect there is provided a computer program comprising computer executable code which when run on at least one processor is configured to cause any one or more of the previous methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description.

BRIEF DESCRIPTION OF THE FIGURES

Embodiments will now be described, by way of example only, with reference to the accompanying Figures in which:

FIG. 8 shows a method performed by or in a UPF in some embodiments:

FIG. 9 shows another method performed by or in a UPF in some embodiments:

FIG. 10 shows another method performed by or in a UPF in some embodiments:

FIG. 11 shows another method performed by or in a UPF in some embodiments:

FIG. 12 shows another method performed by or in a UPF in some embodiments:

FIG. 13 shows another method performed by or in a UPF in some embodiments:

FIG. 14 shows another method performed by or in a UPF in some embodiments:

FIG. 15 shows another method performed by or in a UPF in some embodiments:

FIG. 16 shows a method performed by or in a SMF in some embodiments:

FIG. 17 shows another method performed by or in a SMF in some embodiments:

FIG. 18 shows another method performed by or in a SMF in some embodiments:

FIG. 19 shows another method performed by or in a SMF in some embodiments:

FIG. 20 shows another method performed by or in a SMF in some embodiments:

FIG. 21 shows a method performed by a system in some embodiments:

FIG. 22 shows another method performed by a system in some embodiments:

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Some embodiments may be provided in communication networks which separate the control and user planes.

Some embodiments may relate to a 5G system (5GS) or a 5G type system. The system may comprise one or more network functions (NFs) and one or more network entities (NEs).

The one or more NFs may comprise one or more of the following network functions:
- an Authentication Server Function (AUSF)
- an Access and Mobility Management Function (AMF)
- a Data Network (DN), e.g. operator services, Internet access or 3rd party services
- a Unstructured Data Storage Function (UDSF)
- a Network Exposure Function (NEF)
- a Network Repository Function (NRF)
- a Network Slice Selection Function (NSSF)
- a Policy Control Function (PCF)
- a Session Management Function (SMF)
- a Unified Data Management (UDM)
- a Unified Data Repository (UDR)
- a User Plane Function (UPF)
- a UE radio Capability Management Function (UCMF)
- an Application Function (AF)
- a User Equipment (UE)
- a (Radio) Access Network ((R)AN)
- a 5G-Equipment Identity Register (5G-EIR)
- a Network Data Analytics Function (NWDAF); and
- a CHarging Function (CHF).

The one or more NEs may comprise:
- a Service Communication Proxy (SCP); and
- a Security Edge Protection Proxy (SEPP).

Figure 1:
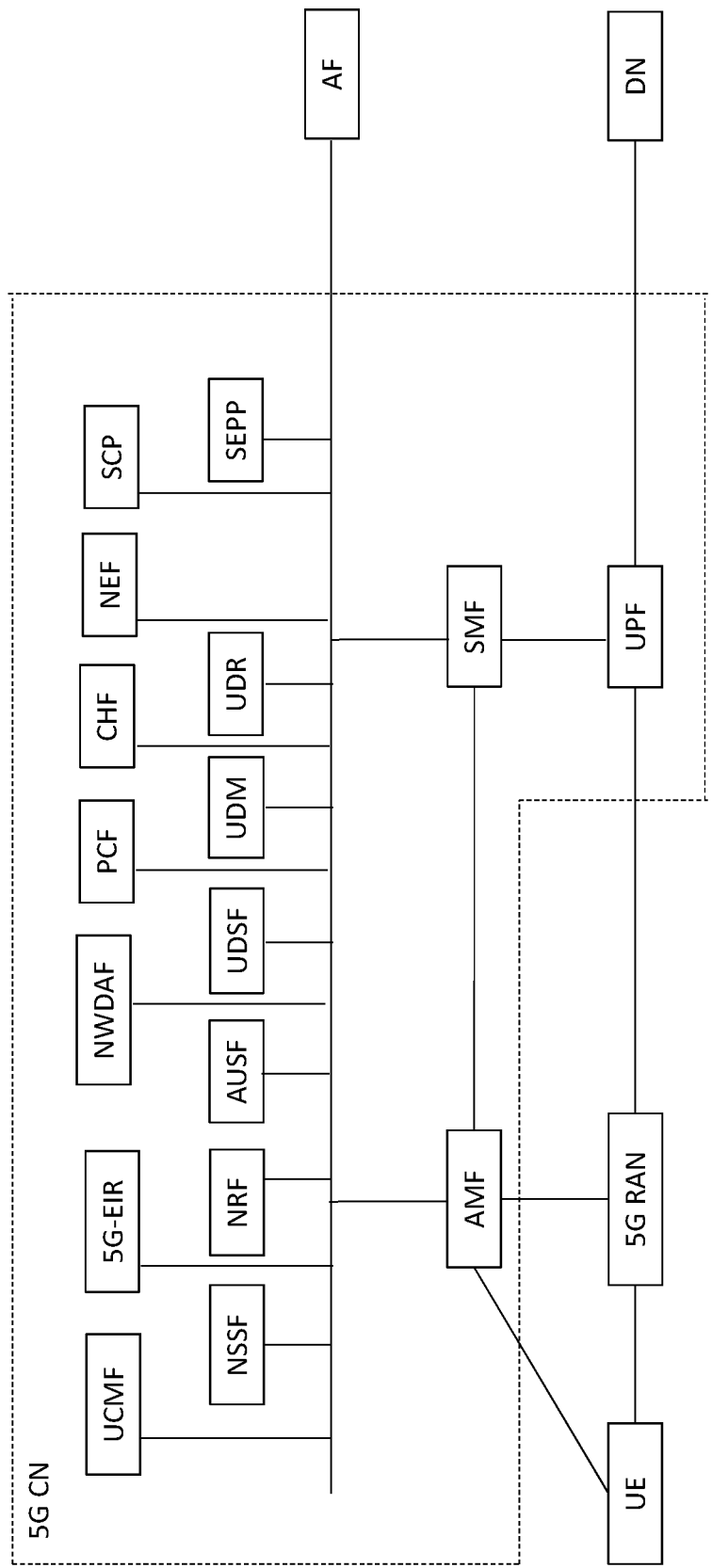
FIG. 1 shows a schematic representation of a 5G system architecture.

FIG. 1 shows a schematic representation of an example of 5GS. The 5GS comprises a UE, a 5G RAN, a 5G core network (5G CN), an AF and a DN.

The 5G RAN may comprise one or more gNodeB (gNB) distributed unit functions connected to one or more gNodeB (gNB) centralized unit functions.

The 5G CN may comprise an AMF, a SMF, a UPF, a UCMF, a NSSF, a 5g-EIR, a NRF, a AUSF, a NWDAF, a UDSF, a PCF, a UDM, a CHF, a UDR, a NEF, a SCP and a SEPP.

Figure 2:
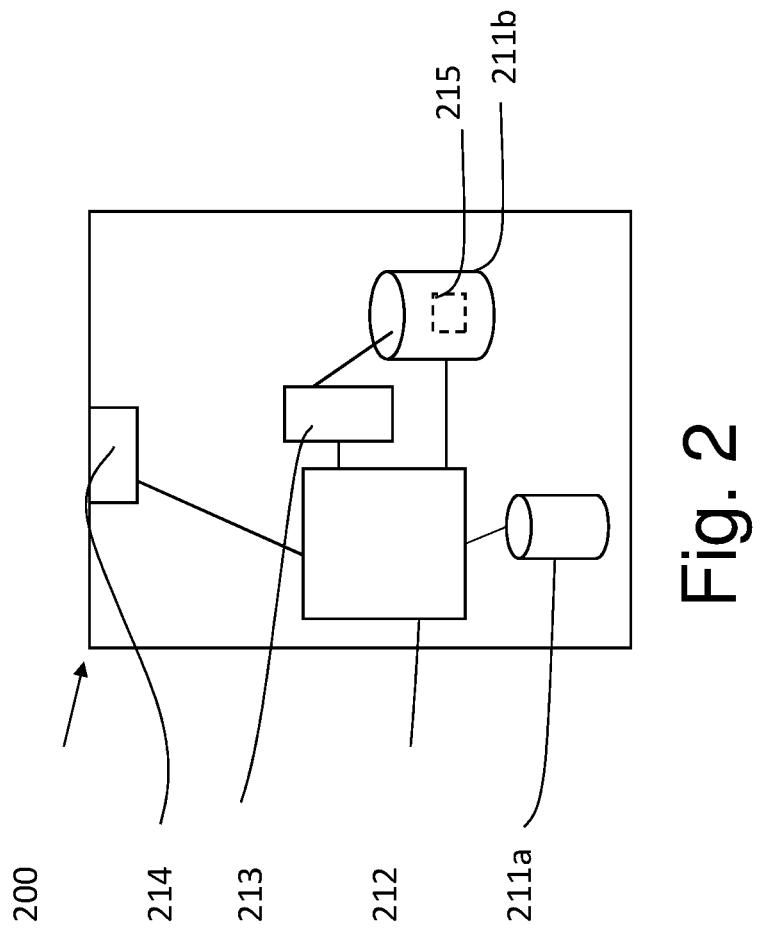
FIG. 2 shows a schematic representation of a control apparatus.

An example apparatus is shown in FIG. 2. FIG. 2 shows an example of an apparatus 200 for a UPF or a SMF. The apparatus comprises at least one memory.

The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b. An interface 214 may be provided to output signals and/or receive signals.

Figure 3:
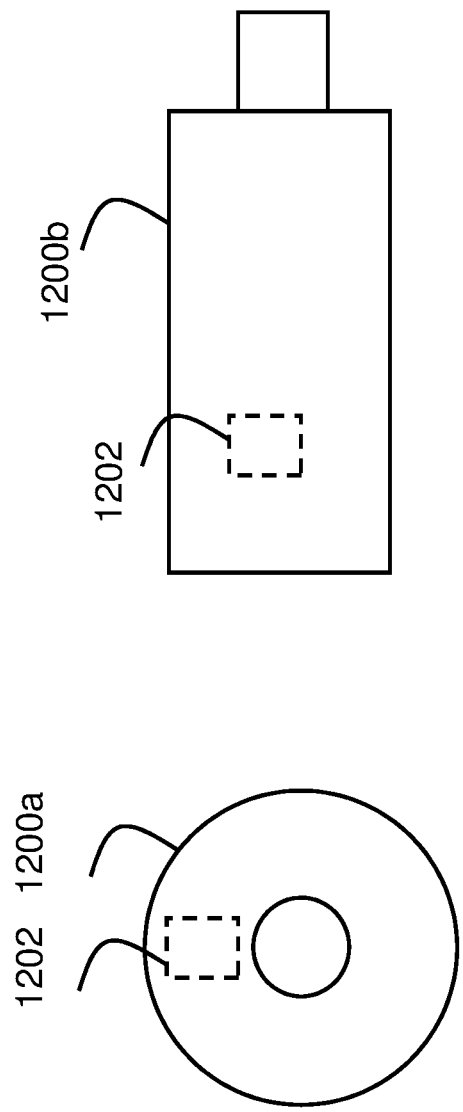
FIG. 3 shows a schematic representation of a non-volatile memory medium storing instructions which when executed by a processor allow a processor to perform one or more of the steps of the above methods.

FIG. 3 shows a schematic representation of non-volatile memory media 1200a (e.g. computer disc (CD) or digital versatile disc (DVD)) and 1200b (e.g. universal serial bus (USB) memory stick) storing instructions and/or parameters 1202 which when executed by a processor allow the processor to perform one or more of the steps of the methods that will be described.

Figure 4:
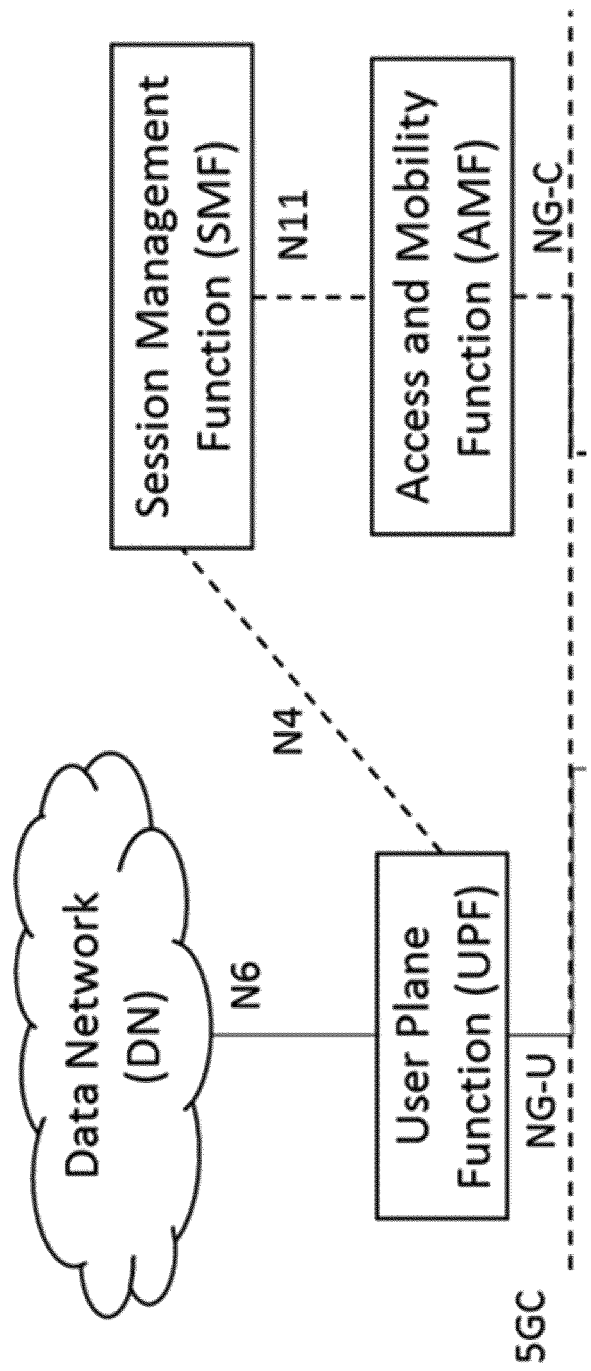
FIG. 4 shows a schematic representation of a block diagram of a 5G network function service discovery mechanism.

FIG. 4 shows a schematic diagram of part of an example 5G core network (CN). FIG. 4 shows the UPF, the SMF, the AMF and the DN.

The UPF (User Plane Function) which may be an Intermediate UPF or a PSA (PDU Session Anchor) provides an anchor point for user IP, Ethernet or Unstructured user data sessions. The UPF may be responsible for forwarding PDU(s) (e.g. IP packets or Ethernet frames) back and forth between
- the DN (data network) and the 5G Access Network (e.g. gNB in case of 3GPP access)
- the DN (data network) and another UPF supporting the PDU Session
- the 5G Access Network The UPF may be controlled by an SMF (Session Management Function) that may receive policies from a PCF (Policy Control Function).

In some embodiments an SMF set may be provided. A SMF Set may comprise functionally equivalent SMF instances that can all have access to the Session Management (SM) contexts handled by the SMF Set and that can serve SM (session management) requests targeting the SMF Set.

An SMF may control the user plane functionalities in the UPF via an interface using the PFCP (packet forwarding control protocol). The interface may be an interface between one SMF instance and one UPF. The PFCP sessions established in the UPF (e.g. to support PDU sessions) may be tied to the SMF instance that created them.

Before establishing any PFCP session (e.g., during a PDU session establishment), the SMF needs to set up a PFCP association with the UPF. The PFCP association establishment procedure is a node related procedure during which the UPF signals its node capabilities (e.g. the features it supports) and configuration (e.g. IP addressing information) to the SMF.

When establishing then a PFCP session, the SMF signals to the UPF in the PFCP session establishment request message one "CP Node ID" (Control Plane Node ID), that can take the form of either an IP address or a FQDN (fully qualified domain name), identifying the SMF instance, and one CP F-SEID (Control Plane Fully Qualified Session identifier) identifying the PFCP session in the CP node, i.e. an IP address+a Session Identifier.

The UPF sends subsequent session related request messages to the SMF for that PFCP session (e.g. to send a Session Report message when a DL packet arrives for a PDU session without an active user plane connection), to the IP address received in the CP F-SEID assigned by SMF.

Where there is an SMF set, any SMF instance from the SMF Set may control any PFCP session created by any other SMF instance of the SMF Set, and/or the UPF may initiate signalling towards any SMF instance of the SMF Set.

For example, the SMF instance that created the PFCP session may no longer be available due to SMF instance failure, SMF instance planned maintenance or scale-in operations, or new SMF instances may have been deployed in the SMF Set (scale-out operation).

Some embodiments may relate to UPF services. Some embodiments may provide a set of UPFs.

Some embodiments may relate to modular UPF support. Modular UPF support may have a performance impact in the user plane. Modular UPF support might impact the throughput offered by the UPF for all UE(s) being served. Some embodiments may provide modular UPF support which does not significantly impact UP processing and allows support for UPF resiliency.

Some embodiments may provide a UPF set. This may provide resiliency in the User plane. This may provide the ability to preserve user plane sessions/contexts even in the presence of UPF failure or restarts.

Some embodiments provide enablers to support stateless UPFs. This means that the UPF does not store transient UE context within its own cache. This may allow the UPFs to share their context data. This may be via a common database. The database may be provided by a UDSF. The database may store transient UE context. This may be all the PFCP session/user plane related information of a PDU session (that has been received from the SMF during the establishment/modification of a PFCP session).

In some embodiments, the UPF ability to store context in the UDSF is enabled. The stable context may be stored in the UDSF when there is no user plane or PFCP (packet forwarding control protocol) traffic for a time duration during a PFCP session. The UPF stores the context in the UDSF (DBs) by calling an appropriate command/services. The UPF is the client for the database using it to store information.

Some embodiments may enable UPF retrieval of context from the UDSF when new PFCP traffic or user plane traffic needs to be processed for a PFCP session. The UPF queries the UDSF to retrieve context.

Some embodiments may enable establishment of a single PFCP association between a given SMF and all the UPFs of an UPF set. When the SMF is itself part of an SMF set, this allows to establish one single PFCP association between all SMFs and all UPFs, that can be shared by all SMFs in a SMF set and all UPFs in a UPF set.

Figure 5A:
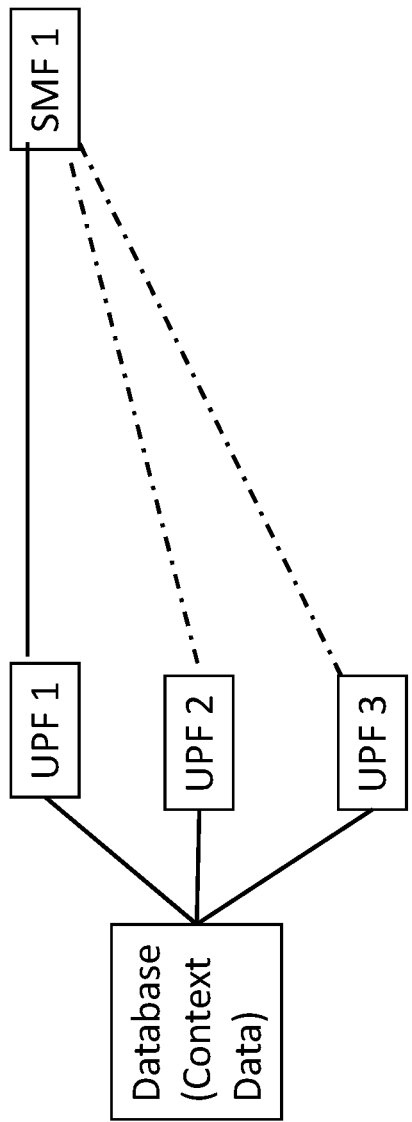
FIG. 5a shows a schematic representation of a set of UPFs and a SMF

Reference is made to FIG. 5a. By way of example only, consider the following scenario. There is one SMF, SMF 1, and three UPFs (UPF 1, UPF 2, UPF3) in the UPF set1. An association established first between any one of the corresponding UPFs and the SMF can be shared by the rest of the UPFs in the UPF set. For example, if there is an association being established between SMF 1 and UPF 1 (represented by the solid line), then this can be shared also by UPF-2 and UPF-3 for communication with the SMF (as represented by the dotted lines). Any one of the UPFs of the UPF set can communicate with the SMF and vice-versa.

Figure 5B:
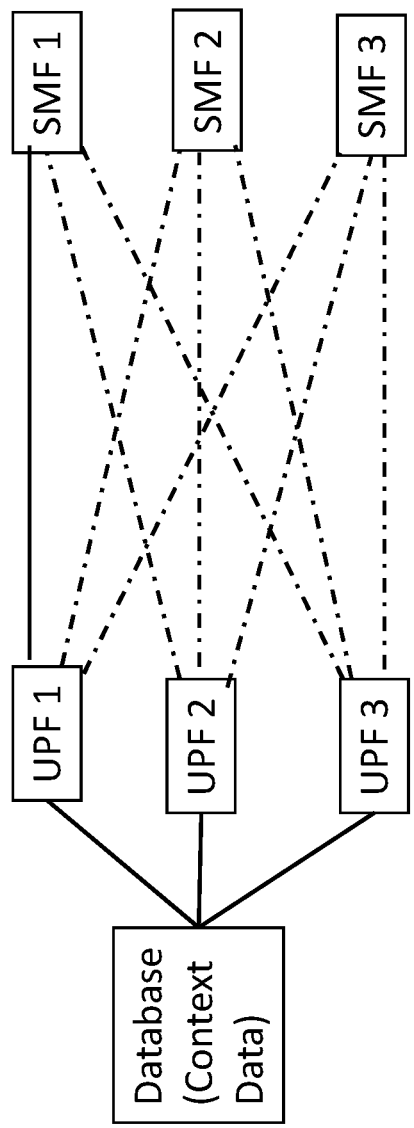
FIG. 5b shows a schematic representation of a set of UPFs and a set of SMFs.

Reference is made to FIG. 5b. By way of example only, consider the following scenario. There are three SMFs (SMF 1, SMF2, SMF 3) in the SMF set 1 and three UPFs (UPF 1, UPF 2, UPF3) in the UPF set1. An association established first between any one of the corresponding SMFs and UPFs can be shared by the rest of the respective sets. For example, if there is an association being established between SMF 1 and UPF 1 (represented by the solid line), then this can be shared also by SMF-2, SMF-3, UPF-2, UPF-3 for communication with each other (as represented by the dotted lines). Any one of the UPFs of the UPF set can communicate with any one of the SMFs of the SMF set and vice-versa.

Alternatively, if one PFCP association is established per SMF and UPF pair, then a PFCP session may be moved from one PFCP association to another PFCP association when reselecting a different UPF for a PFCP session. The same may also apply when there is a PFCP association between a SMF set and a UPF and a PFCP session is moved to another UPF controlled by the SMF set via a different PFCP association.

Some embodiments may allow both stateful UPF and stateless UPF to be supported. This may provide good resiliency. This may provide an improved efficiency in UP processing. State may comprise user plane session context information. The user plane session context information may comprise one or more of GTP-U tunnel IP address and TEID (tunnel end point identifier), Packet Detection Rules, Forwarding Action Rules, QoS Enforcements Rules, Usage Reporting Rules, Buffering Action Rules, Trace Data, QFI (QoS flow identifier), 5QI (5G QoS Identifier) and/or the like.

Some embodiments may provide the option to have a preferred binding to one UPF of the UPF set for a given PFCP session at any given time. That is the UPF can indicate when no selection is allowed and/or indicate selection of the UPF for the given PFCP session using a binding indication from the UPF.

Some embodiments may enable selection of any UPF within the UPF set for the given PFCP session.

Some embodiments may allow the selection of a different UPF (which is not a PSA (PDU session anchor)) in the same UPF set for a given PFCP session. This may be for example for an Intermediate UPF (I-UPF, V-UPF (visiting UPF), ULCL/BP (uplink classifier/branching point). This may be to address a failure, to provide a scale-in operation, and/or for an overload condition. A ULCL is an UPF functionality that aims at diverting uplink traffic, based on filter rules provided by SMF, towards the DN.

Some embodiments may allow the selection of a different UPF in the UPF Set for a PFCP session for a UPF acting as a PSA. This may require support for rerouting traffic from routers towards the new UPF.

As discussed, some embodiments may provide a UPF set in the EPC and 5GC. UPFs of a UPF set may provide one or more of distribution, redundancy, resiliency and scalability as a set of functionally equivalent UPFs. UPFs of a UPF set may share their context data via a common DB such as UDSF and are able to successively support a given PFCP session over time.

It should be appreciated, that the UPF may be any suitable user plane function. The UPF may be provided by one or more of a SGW-U (serving gateway user plane function), PGW-U (PDN gateway user plane function), TDF-U (traffic detection function user plane function or a UPF, 5GC User Plane Function, and more generally any User Plane Function supporting the PFCP protocol. A UPF set may be made up of only a single type of entity in some embodiments. In other embodiments, a UPF set may be made up of a plurality of different types of entity.

The SMF may be any suitable control plane CP session management function. The SMF may be provided by one or more of a SGW-C (serving gateway control plane function), PGW-C (PDN gateway control plane function), TDF-C (traffic detection function control plane function or a 5GC SMF, and more generally by any Control Plane function supporting the PFCP protocol. A SMF set may be made up of only a single type of entity in some embodiments. In other embodiments, a SMF set may be made up of a plurality of different types of entity.

A UPF service area may comprise one or more UPF sets.

In some embodiments a UPF service area may be as described in See TS 23.501.

In some embodiments, a UPF service area may be an area consisting of one or more TA(s) (tracking areas) within which a PDU Session associated with the UPF can be served by (R)AN nodes via an interface (for example a N3 interface) between the (R)AN and the UPF. This may be without the need to add a new UPF in between or to remove/reallocate the UPF.

In some embodiments, the UPF registers the UPF set ID to which it belongs within its profile in the NRF. The composition of UPFs in a UPF Set may be determined at the time of deployment. Each UPF instance can have an identifier/FQDN/DNN etc. Each UPF set may be identified by UPF Set ID. Defining the actual value and mapping of values to actual UPF instance happens at deployment.

Alternatively or additionally, UPFs from a UPF set are provisioned in a Domain Name System under a new UPF set FQDN.

An SMF may discover the UPFs that belong to a same UPF set by one or more of:

using the NRF NFDiscovery service;

using the DNS; and receiving alternative UPF addresses from the UPF during the PFCP association setup or update.

A single PFCP association may be setup between an SMF (or SMF set) and a UPF set.

In some embodiments, one PFCP association may be established per pair of SMF (or SMF Set) and UPF. This may be as defined by the PFCP protocol (see for 3GPP TS 29.244).

Some embodiments may support the moving of a PFCP session from one UPF to another one within the same UPF Set.

In some embodiments, if a single PFCP association is established between an SMF and a UPF Set, the Node ID returned by the UPF during the PFCP association setup may be set to an FQDN representing the UPF Set. If a PFCP association is established per SMF and UPF of the UPF set, each UPF may report to the SMF its own Node ID (as per existing PFCP protocol) plus the UPF set to which it belongs by including a new UPF Set ID in PFCP association setup response (for an SMF initiated PFCP association setup) or in the PFCP association setup request (for a UPF initiated PFCP association setup).

The UPF may indicate that it supports the UPF set feature during the PFCP association setup. This may indicate to the SMF that PFCP sessions established in the UPF can be successively supported by different UPFs of the UPF Set.

The UPF may indicate the IP addresses of alternative UPFs within the UPF set during the establishment of the PFCP association.

Figure 6:
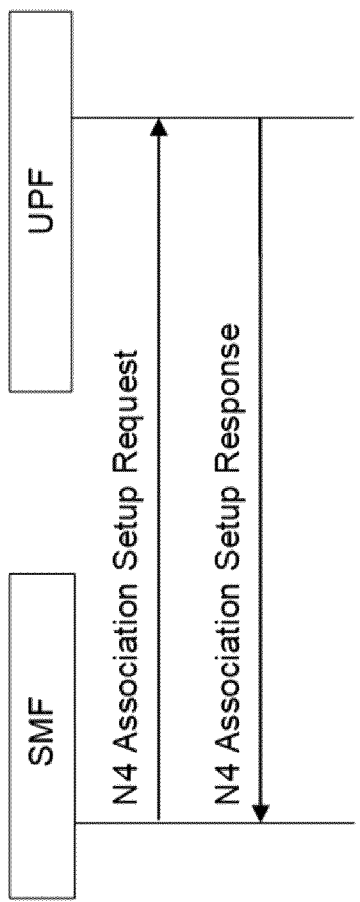
FIG. 6 shows the signal flow when setting up an association.

Reference is made to FIG. 6 which shows an example N4 Association setup procedure which is used to setup an N4 association between the SMF and the UPF, to enable the SMF to use the resources of the UPF and the UPF set subsequently to establish N4 Sessions.

The SMF and UPF may exchange the supported functionalities on each side during this procedure. In this example, the setup of an N4 association is initiated by the SMF.

The SMF initiates the N4 Association Setup procedure to request to setup an N4 association towards a UPF prior to establishing a first N4 session on this UPF.

When receiving an N4 Association Setup Request, the UPF shall send an N4 Association Setup Response. This response may indicate the IP addresses of alternative UPFs within the UPF set during the establishment of the PFCP association. Alternatively or additionally, the response may indicate that the UPF supports the UPF set feature. The Node ID returned by the UPF in the response may be set to an FQDN representing the UPF Set. Alternatively or additionally the UPF may provide its own Node ID plus the UPF set ID in the response.

In other embodiments, the association set up may be initiated by the UPF. The UPF may include one or more of the mentioned information in the request relating to the UPF set in the request directed to the SMF.

The SMF may receive the UPF identities of the UPFs of the UPF set from the UPF with which the association is set up or using for example the DNS or the NRF discovery process. In the latter case, this may be based on the UPF set information received from the UPF with which the association is set up.

Figure 7:
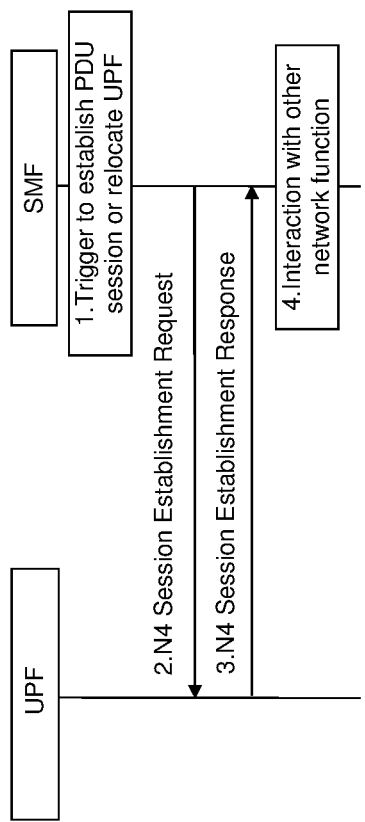
FIG. 7 shows the signal flow when establishing a session.

Reference is made to FIG. 7 which shows an example of a N4 Session establishment procedure which is used to create an initial N4 session context for a PDU Session at the UPF. The SMF may assign a new N4 Session ID and provides it to the UPF. The N4 Session ID may be stored by both entities and used by the SMF to identify the N4 session context during their interaction. As mentioned previously, the UPF context may be stored in the database so it is available to all the UPFs of the set. The SMF may store the relation between the N4 Session ID and PDU Session for a UE.

As shown in FIG. 7, in step 1, the SMF receives a trigger to establish a new PDU Session or change the UPF (not part of the same set of UPFs) for an established PDU Session.

In step 2, the SMF sends an N4 session establishment request message to the UPF that contains the structured control information which defines how the UPF needs to behave.

In step 3, the UPF responds with an N4 session establishment response message containing any information that the UPF has to provide to the SMF in response to the control information received.

In step 4, the SMF may interact with the network function which triggered this procedure (e.g. AMF or PCF).

In some embodiments, when establishing a PFCP session, a UPF shall assign, in the UP (user plane) F-SEID (Fully Qualified Session identifier) IE (information element) of the PFCP Session Establishment Response, a unique SEID within the UPF set for that PFCP session; alternatively, the SEID does not need to be unique within the UPF set, but the F-SEID (i.e. IP address+SEID) shall be unique.

Any UPF in the UPF Set may issue requests to the SMF (or SMF set) for a given PFCP session. The requests may be any suitable request. For example, the request may be to send PFCP Session Report Requests to report the arrival of new DL traffic or to report traffic measurements or detected events. This may be the case when the UPF that was supporting a PFCP session has failed or is no longer available.

An SMF may initiate PFCP session related requests towards any UPF of the UPF set. This may be if the IP address included in the UP F-SEID assigned to the PFCP session is not responsive. The SMF may use the IP addresses of alternative UPFs discovered as described above. By default, the SMF may send PFCP session related messages related to a given PFCP session to the IP address of the UP F-SEID of the PFCP session. When reselecting a different UPF for a given PFCP session, the SMF may include in the PFCP session related message the old UP F-SEID that was used with the previous UPF. This is to enable the new UPF to identify the PFCP session that is moved, when the SEID is not unique within the UPF Set (but the F-SEID is).

A UPF may redirect an SMF initiated PFCP session related request (e.g. a PFCP session modification request or a PFCP session deletion request) to a different UPF in the UPF Set. This may be achieved by rejecting the request. The cause for rejecting the request may be with a cause "Redirection Requested" or the like. The rejection message may include an alternative UPF IP Address IE providing the IP address of the new UPF to contact.

Alternatively, a UPF may forward the SMF request to another UPF in the UPF set and the new UPF may respond to the SMF. Optionally, the UP F-SEID IE with the IPv4 or IPv6 address of the new UPF may be provided to the SMF.

It should be appreciated that this may address situations (i.e. race conditions) where a different UPF would have been reselected for the PFCP session by the UPF set and by the SMF. For example this may arise due to a concurrent PFCP request and arrival of user plane traffic for the PFCP session.

A UPF may also update a PFCP session by including the UP F-SEID with the IPv4 or IPv6 address of a new UPF in a PFCP Session Report Request. This may be done at any time in some embodiments.

The SMF in some embodiments will not trigger a restoration procedure when a heartbeat failure is detected for the IP address of the assigned UP F-SEID. This is where the PFCP session can be controlled by different UPFs of a UPF set. Restoration procedures may be triggered only if heartbeat procedures fail with all the IP addresses of all the UPFs in the UPF set. In other words, a restoration procedure may be triggered only for changes across UPF set and not within UPF set. This may reduce service disruption for the UE and the corresponding session (involving the end user and the application.

Some embodiments enable all UPFs of a same UPF set to successively support a given PFCP session without causing extra signalling over the N4 interface.

A UPF may at any time remove its context and free its resources for a given PFCP session and store the stable context in the UDSF when there is no user plane or PFCP traffic for a while for a PFCP session.

Any UPF from the same UPF set can then restore the context from the UDSF when new PFCP traffic or user plane traffic needs to be processed for a PFCP session. In some embodiments, it is preferred that the restoration of contexts should be done in the UPF currently supporting the session (i.e. in the UPF corresponding to the PFCP session's UP F-SEID).

When a different UPF is reselected for one or more PFCP sessions, either:
 a) the new UPF is able to take over the IP address (and TEID for GTP-U tunnels) of the previous UPF; or
 b) the SMF updates the UPF's peers with the new IP address used by the PFCP session. In this case, the new UPF may signal the new GTP-U (GPRS tunnelling protocol user plane) or UE's IP address(es) to the SMF.

IP addresses may correspond to a UE's PDU session IP address or to a GTP-U tunnel IP address.

The new UPF may advertise the IP address to its MAC address mapping to the peer routers. This may be through mechanisms like ARP (address resolution protocol) announcement (Gratuitous ARP) as specified in IETF RFC 5227.

For a PSA, upstream IP routers may also be advertised, so that the upstream routers forward the downlink IP packets to the right UPF/PSA.

For option b), an SMF can update the 5G-AN with the new IP address of the new GTP-U endpoint in the new UPF. This may be done using N2 procedures. In some embodiments the update may be done using a PDU session resource setup request during a service request procedure.

If two or more UPFs are inserted in the data path of the PDU session controlled by the SMF, the SMF can update the peer UPF with the new GTP-U tunnel's IP address using N4 signalling. For PDU sessions involving an I-SMF or for HR (home routed) PDU sessions, this may require N16a/N16a signalling or other signalling to update the peer node. In some embodiments, this may be used for priority PDU sessions (e.g. IMS sessions) or in failure scenarios.

If option b) is applied for a PSA, the new UE's IP address may need to be signalled to the UE. This may be using Session and Service Continuity (SCC) mode 2 or 3 procedures defined in 3GPP TS 23.501.

Some embodiments may support UPF resiliency. There may be a plurality of active UPFs within a single set. This may be without damaging performance of the UP traffic.

Some embodiments may enable flexibility to support dynamic binding to a given UPF for efficiency. This may be done when need, for example when there is a relatively large amount of ongoing UP traffic ongoing. This may at the same time allow stateless UPF support for resiliency, for example, when there is not very much ongoing UP traffic.

Some embodiments may improve scalability by allowing stateless UPFs for support of applications with infrequent user plane traffic. For example, some embodiments may be used with consumer Internet of things CIoT.

Reference is made to FIG. 8 which shows a method. The method may be performed in an apparatus in the UPF or by the UPF.

In step A1, the method comprises receiving at a user plane function a request to establish an association from a session management function.

In step A2, the method comprises causing a response to be provided to the session management function comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a FQDN for the user plane function set.

Reference is made to FIG. 9 which shows a method. The method may be performed in an apparatus in the UPF or by the UPF.

In step B1, the method comprises receiving at a user plane function a request to establish a session from a session management function, said user plane function being part of a set of user plane functions.

The session may be a PFCP session.

In step B2, the method comprises causing a response to be provided to the session management function comprising information uniquely identifying the session in the set of user plane functions.

The information uniquely identifying the PFCP session in the set of user plane functions may be a unique SEID or it may be a UPF IP address and SEID.

Reference is made to FIG. 10 which shows a method. The method may be performed in an apparatus in the UPF or by the UPF.

In step C1, the method comprises determining at a user plane function which is part of a set of user plane functions that a new user plane function has been assigned to support a session.

In step C2, the method comprises causing information about the new user plane function assigned to the session to be sent to a session management function.

The session may be a PFCP session.

Reference is made to FIG. 11 which shows a method. The method may be performed in an apparatus in the UPF or by the UPF.

In step D1, the method comprises causing context information associated with a PFCP session between a session management function and a user plane function of a set of user plane functions to be stored in a database and/or to be shared by the user plane functions of the set of user plane functions.

The session may be a packet forward control protocol session

The user plane function may cause the information to be stored in the database.

The method may comprise causing the context information to be stored when there is no traffic for the session.

The method may comprise causing the context information to be stored when there is no signalling or user plane traffic for the session.

The method may comprise retrieving said context information from said database to restore a context associated with the session.

The method may comprise retrieving said context information by said user plane function or another user plane function of said set of user plane functions.

The method may comprise determining that there is traffic to be processed and in response retrieving said context information.

The method may comprise removing by the user plane function the context information of a session from the user plane function. This may free resources in the user plane function associated with the context. This may be while there is a session between one of the user plane functions of the set of user plane functions and the session management function.

Reference is made to FIG. 12 which shows a method. The method may be performed in an apparatus in the UPF or by the UPF.

In step E1, the method comprises retrieving by a user plane function of a set of user plane functions, from a database, context information associated with a session established between a session management function and a different user plane function of a set of user plane functions.

The session may be a packet forward control protocol session

In step E2, the method comprises using said context information for the session between said user plane function and said session management function.

Reference is made to FIG. 13 which shows a method. The method may be performed in an apparatus in the UPF or by the UPF.

In step F1, the method comprises receiving at a user plane function of a set of user plane functions, a request from a session management function.

In step F2, the method comprises forwarding the request to a different user plane function of the set of user plane functions.

The user plane function towards which the request is forwarded may respond to the session management function.

The message may be a request.

Reference is made to FIG. 14 which shows a method. The method may be performed in an apparatus in the UPF or by the UPF.

In step G1, the method comprises receiving at a user plane function of a set of user plane functions, a message from a session management function.

In step G2, the method comprises causing a response to be sent to the session management function indicating that the message is to be redirected to a different user plane function of the set of user plane functions.

The response may comprise information identifying the different user plane function.

Reference is made to FIG. 15 which shows a method. The method may be performed in an apparatus in the UPF or by the UPF.

In step H1, the method comprises causing a message to be sent to a session management function from a user plane function of a set of user plane functions, said message comprising information indicating that a session between the user plane function and the session management function is to be updated to use a different user plane function of the set of user plane functions.

The session may be a packet forward control protocol session.

Reference is made to FIG. 16 which shows a method. The method may be performed in an apparatus in the SMF or by the SMF.

In step 11, the method comprises causing a request to be transmitted to a user plane function from a session management function, said request being a request to establish an association.

In step 12, the method comprises receiving at the session management function a response comprising information indicating that the user plane function is part of a set of user plane functions.

The information indicating that the user plane function is part of a set of user plane functions may comprise information identifying the set of user plane functions and/or information identifying other user plane functions of the set.

The information identifying the set of user plane functions may be a user plane function set identifier.

The information indicating that the user plane function is part of a set of user plane functions may comprise a FQDN for the user plane function set.

Reference is made to FIG. 17 which shows a method. The method may be performed in an apparatus in the SMF or by the SMF.

In step J1, the method comprises causing a request to be transmitted to a user plane function from a session management function, said request to establish a session, said user plane function being part of a set of user plane functions The session may be a packet forward control protocol session.

In step J2, the method comprises receiving a response from the user plane function comprising information uniquely identifying the session in the set of user plane functions.

The information uniquely identifying the session in the set of user plane functions may be a unique session identifier.

The information uniquely identifying the session in the set of user plane function may be a user plane function internet protocol address and a session identifier.

Reference is made to FIG. 18 which shows a method. The method may be performed in an apparatus in the SMF or by the SMF.

In step K1, the method comprises receiving information from a user plane function which is part of a set of user plane functions that a new user plane function in the set of user plane functions has been assigned for supporting a session.

The session may be a packet forward control protocol session

Reference is made to FIG. 19 which shows a method. The method may be performed in an apparatus in the SMF or by the SMF.

In step L1, the method comprises moving, by a session management function or a user plane function, a session from one user plane function of a set of user plane functions to a second user plane function of the set of user plane functions.

The session may be a packet forward control protocol session

In another embodiment, the method comprises moving, by a user plane function, a session from one user plane function of a set of user plane functions to a second user plane function of the set of user plane functions.

The session may be a packet forward control protocol session

Reference is made to FIG. 20 which shows a method. The method may be performed in an apparatus in the SMF or by the SMF.

In step M1, the method comprises discovering by a session management function which user plane functions belong to a given set of user plane functions.

The discovering may comprise receiving information about the user plane functions belonging to the set of user plane functions from one of the user plane functions of the set of user plane functions.

The discovering may comprise using a domain name system.

The discovering may comprise using a network repository function.

Reference is made to FIG. 21 which shows a method. The method may be performed in an apparatus in the SMF or by the SMF and/or by an apparatus in the UPF or the UPF.

In step N1, the method comprises setting up an association between a first user plane function of a set of user plane functions and a session management function.

In step N2, the method comprises sharing that association with one or more other user plane functions of the set.

Reference is made to FIG. 21 which shows a method. The method may be performed in an apparatus in the SMF or by the SMF and/or by an apparatus in the UPF or the UPF.

In step O1, the method comprises setting up a first association between a first user plane function of a set of user plane functions and a session management function.

In step O2, the method comprises setting up a session between the first user plane function and the session management function.

In step O3, the method comprises setting up a second association between a second user plane function of the set of user plane functions and the session management function.

In step O4, the method comprises moving the session to the second association.

Figure 23:
FIG. 23 shows another method performed by a system in some embodiments.

Reference is made to FIG. 23 which shows a method. The method may be performed in an apparatus in the SMF or by the SMF and/or by an apparatus in the UPF or the UPF.

In step P1, the method comprises setting up an association between a first user plane function of a set of user plane functions and a first session management function of a set of session management functions.

In step P2, the method comprises sharing that association with one or more other user plane functions of the set and one or more other session management functions.

In some embodiments any user plane function in the user plane function set may issue a request to the session management function or the session management function set. This may be for a given session.

The session may be a packet forward control protocol session

This may be to send session report requests, for example to report the arrival of new DL traffic or to report traffic measurements or detected events. This may be the case when the user plane function of the set of user plane functions that was supporting a session has failed or is no longer available.

Figure 24:
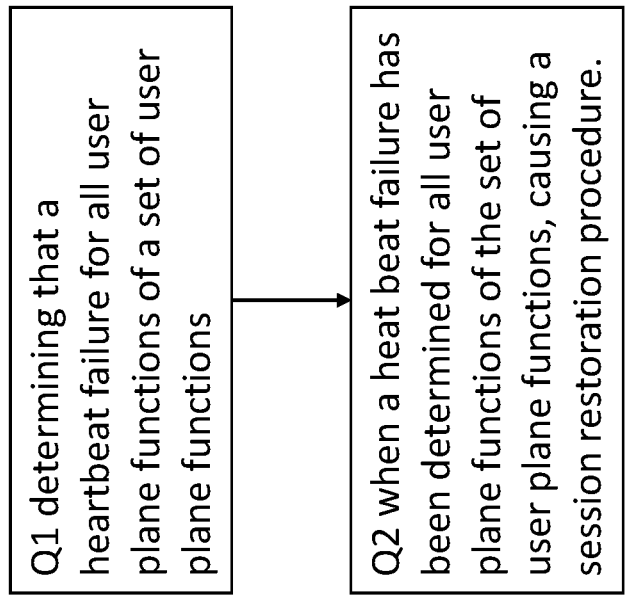
FIG. 24 shows another method performed by or in a SMF in some embodiments.

Reference is made to FIG. 24 which shows a method. The method may be performed in an apparatus in the SMF or by the SMF In step Q1, the method comprises determining that a heartbeat failure occurs for all user plane functions of a set of user plane functions.

In step Q2, the method comprises, when a heat beat failure has been determined for all user plane functions of the set of user plane functions, causing a session restoration procedure.

The method may comprise, determining a heartbeat failure associated with an IP address of an assigned user plane function and in response determining if there is a heartbeat failure for other user plane functions of the set of user plane functions.

In some embodiments, the method may comprise causing a session restoration procedures only if heartbeat failure occurs for all the IP addresses of all the user plane functions in the user plane function set.

Figure 25:
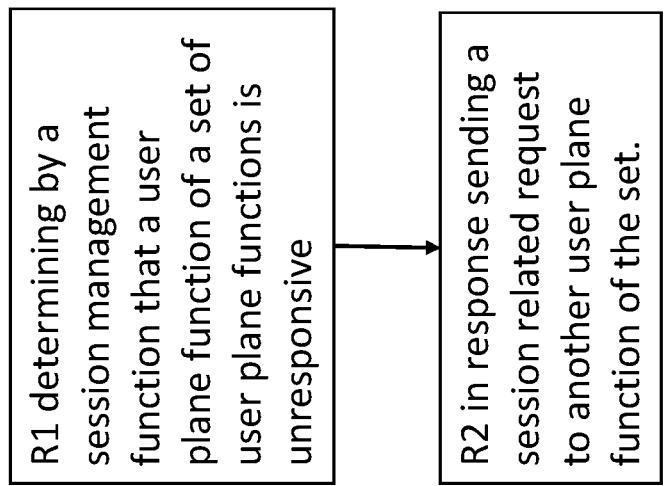
FIG. 25 shows another method performed by or in a SMF in some embodiments.

Reference is made to FIG. 25 which shows a method. The method may be performed in an apparatus in the SMF or by the SMF.

In step R1, the method comprises determining by a session management function that a user plane function of a set of user plane functions is unresponsive.

In step R2, the method comprises, in response, sending a session related request to another user plane function of the set.

In some embodiments, a session management function may initiate session related requests for a given session towards any user plane function of the user plane set. This may be when an IP address for the UPF assigned to the session is not responsive.

The SMF may use the IP addresses of alternative UPFs discovered such as described previously.

By default, the session management function may send session related messages related to a given session to the IP address of the user plane function which set up the session or is currently active for the session.

In some scenarios, the terms "N4" and "PFCP" (e.g. PFCP session, PFCP association, etc) may be used interchangeably.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the UPF and/or the SMF and/or any of the NFs.

As used in this application, the term "circuitry" may refer to one or more or all of the following:

(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus, comprising:
at least one processor; and
at least one memory including computer code, the at least one memory and the computer code configured, with the at least one processor, to cause the apparatus at least to:
receive, at a user plane function, a request to establish a session from a session management function, said user plane function being part of a set of user plane functions; and
cause a response to be provided to the session management function, the response comprising information uniquely identifying the session in the set of user plane functions, the information comprising a user plane function IP address and a session endpoint identifier,
wherein the at least one memory and the computer code are further configured, with the at least one processor, to cause the apparatus at least to:
remove, by the user plane function, context information of the session from the user plane function and free resources in the user plane function associated with the context while there is a session between one of the user plane functions of the set of user plane functions and the session management function; and
support stateful user plane functions and stateless user plane functions to provide resiliency, wherein state comprises user plane session context information that includes GTP-U tunnel IP address and tunnel end point identifier, Packet Detection Rules, Forwarding Action Rules, QoS Enforcements Rules, Usage Reporting Rules, Buffering Action Rules, Trace Data, QoS flow identifier, and 5Q1 (5G QoS Identifier).

2. The apparatus of claim 1, wherein the at least one memory and the computer code are further configured, with the at least one processor, to cause the apparatus at least to:
determine, at the user plane function, that a new user plane function has been assigned to support a session; and
cause information about the new user plane function assigned to support the session to be sent to the session management function.

3. The apparatus of claim 1, wherein the at least one memory and the computer code are further configured, with the at least one processor, to cause the apparatus at least to:
cause context information associated with the session between the session management function and the user plane function to be stored in a database.

4. The apparatus of claim 3, wherein the at least one memory and the computer code are further configured, with the at least one processor, to cause the apparatus at least to:
cause the context information to be stored when there is no signaling or user plane traffic for the session.

5. The apparatus of claim 3, wherein the at least one memory and the computer code are further configured, with the at least one processor, to cause the apparatus at least to:
retrieve context information from said database to restore a context associated with the context information.

6. The apparatus of claim 1, wherein the at least one memory and the computer code are further configured, with the at least one processor, to cause the apparatus at least to:
determine there is traffic to be processed in response retrieving context information for a respective context.

7. The apparatus of claim 1, wherein the at least one memory and the computer code are further configured, with the at least one processor, to cause the apparatus at least to:
retrieve, by the user plane function, context information from a database, the context information being associated with a session established between the session management function and a different user plane function of the set of user plane functions; and
use said context information for the session between the user plane function and the session management function.

8. The apparatus of claim 1, wherein the at least one memory and the computer code are further configured, with the at least one processor, to cause the apparatus at least to:
receive, at the user plane function, a message from the session management function; and
forward the message to a different user plane function of the set of user plane functions.

9. The apparatus of claim 1, wherein the at least one memory and the computer code are further configured, with the at least one processor, to cause the apparatus at least to:
receive, at the user plane function, a message from the session management function; and
cause a response to be sent to the session management function, the response indicating that the message is to be redirected to a different user plane function of the set of user plane functions.

10. The apparatus of claim 9,
wherein the response comprises information identifying the different user plane function.

11. The apparatus of claim 1, wherein the at least one memory and the computer code are configured, with the at least one processor, to cause the apparatus at least to:
cause a message to be sent to the session management function from the user plane function,
wherein said message comprises information indicating the session between the user plane function and the session management function is to be updated to use a different user plane function of the set of user plane functions.

12. An apparatus, comprising:
at least one processor; and
at least one memory including computer code, the at least one memory and the computer code configured, with the at least one processor, to cause the apparatus at least to:
cause, at a session management function, a request to be transmitted to a user plane function, said request being a request to establish a session; and
receive, at the session management function, a response comprising information uniquely identifying the user plane function of a set of user plane functions,
wherein the information uniquely identifying the user plane function of a set of user plane functions indicates that the user plane function is part of a set of user plane functions and comprises information identifying the set of user plane functions and information identifying other user plane functions of the set, and wherein the information identifying the set of user plane functions comprises a user plane function set identifier and a fully qualified domain name for the user plane function set,
wherein the at least one memory and the computer code are configured, with the at least one processor, to cause the apparatus at least to:
not trigger a restoration procedure when a heartbeat failure is detected for the IP address of an assigned user plane function session endpoint identifier and trigger restoration procedures only if heartbeat procedures fail with all the IP addresses of all the user plane functions in the user plane function set.

13. The apparatus of claim 12, wherein the at least one memory and the computer code are configured, with the at least one processor, to cause the apparatus at least to:
receive, from the user plane function, information that a new user plane function of the set of user plane functions has been assigned to support a session.

14. The apparatus of claim 12, wherein the at least one memory and the computer code are further configured, with the at least one processor, to cause the apparatus at least to:
move, by the session management function, a session from a first user plane function of the set of user plane functions to a second user plane function of the set of user plane functions.

15. The apparatus of claim 12, wherein the at least one memory and the computer code are further configured, with the at least one processor, to cause the apparatus at least to:
discover, by the session management function, which user plane functions belong to a given set of user plane functions using a domain name system and a network repository function.

16. The apparatus of claim 12, wherein the at least one memory and the computer code are further configured, with the at least one processor, to cause the apparatus at least to:
determine, by the session management function, the user plane function is unresponsive; and
send a session-related request to another user plane function of the set of user plane functions in response to determining the user plane function is unresponsive.

17. The apparatus of claim 12,
wherein the session comprises a packet forward control protocol (PFCP) session.

18. The apparatus of claim 12,
wherein the information uniquely identifying the session in the set of user plane function comprises at least one of:
a user plane function internet protocol address; or
a session identifier.

19. A method, comprising:
receiving, at a user plane function, a request to establish a session from a session management function, said user plane function being part of a set of user plane functions; and
causing a response to be provided to the session management function, the response comprising information uniquely identifying the session in the set of user plane functions, the information comprising a user plane function IP address and a session endpoint identifier,
wherein the at least one memory and the computer code are further configured, with the at least one processor, to cause the apparatus at least to:
remove, by the user plane function, context information of the session from the user plane function and free resources in the user plane function associated with the context while there is a session between one of the user plane functions of the set of user plane functions and the session management function; and
support stateful user plane functions and stateless user plane functions to provide resiliency, wherein state comprises user plane session context information that includes GTP-U tunnel IP address and tunnel end point identifier, Packet Detection Rules Forwarding Action Rules, QoS Enforcements Rules, Usage Reporting Rules, Buffering Action Rules, Trace Data, QoS flow identifier, and 5QI (5G QoS Identifier).

* * * * *